United States Patent
Bodin

(10) Patent No.: US 9,510,265 B2
(45) Date of Patent: Nov. 29, 2016

(54) ROUTING METHOD AND A UNIT FOR COMMUNICATION BETWEEN VEHICLES

(71) Applicant: Orange, Paris (FR)

(72) Inventor: Pascal Bodin, Grasse (FR)

(73) Assignee: Orange, Paris (FR)

( * ) Notice: Subject to any disclaimer, the term of this patent is extended or adjusted under 35 U.S.C. 154(b) by 101 days.

(21) Appl. No.: 14/387,834

(22) PCT Filed: Mar. 28, 2013

(86) PCT No.: PCT/FR2013/050686
§ 371 (c)(1),
(2) Date: Sep. 24, 2014

(87) PCT Pub. No.: WO2013/144520
PCT Pub. Date: Oct. 3, 2013

(65) Prior Publication Data
US 2015/0063243 A1    Mar. 5, 2015

(30) Foreign Application Priority Data

Mar. 29, 2012  (FR) .................................... 12 52840

(51) Int. Cl.
| | |
|---|---|
| *H04W 40/20* | (2009.01) |
| *H04L 12/54* | (2013.01) |
| *H04W 4/04* | (2009.01) |
| *H04W 84/18* | (2009.01) |
| *H04L 29/08* | (2006.01) |

(52) U.S. Cl.
CPC .......... *H04W 40/20* (2013.01); *H04L 12/5689* (2013.01); *H04L 67/12* (2013.01); *H04W 4/046* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 6,256,579 B1 | 7/2001 | Tanimoto | |
| 2004/0258011 A1* | 12/2004 | Hiyama et al. | ............... 370/328 |
| 2007/0149204 A1* | 6/2007 | Redi et al. | .................... 455/446 |
| 2010/0074266 A1* | 3/2010 | Kim et al. | .................... 370/401 |
| 2011/0012756 A1* | 1/2011 | Yamamoto | .................... 340/905 |

OTHER PUBLICATIONS

Garcia De La Fuente, et al. "Performance Analysis of Position-Based Routing Approaches in VANETS," Proceedings of the 9th International Conference on Mobile Wirelsss Communications Networks, Cork, Ireland, Sep. 19-21, 2007, pp. 16-20.
Leontiadis, et al. "GeOpps: Geographical Opportunistic Routing for Vehicular Networks," IEEE International Symposium on a World of Wireless, Mobile and Multimedia Networks, Jun. 1, 2007, 6 pages.
Leontiadis, et al. "Extending Access Point Connectivity through Opportunistic Routing in Vehicular Networks," IEEE INFOCOM 2010 Proceedings, Piscataway, NJ, USA, Mar. 14, 2010, 5 pages.
International Search Report mailed Jun. 28, 2013 for International Application No. PCT/FR2013/050686 filed Mar. 28, 2013.
International Search Report and Written Opinion of the International Searching Authority mailed Jun. 28, 2013 for International Application No. PCT/FR2013/050686 filed Mar. 28, 2013.

* cited by examiner

*Primary Examiner* — Chi H Pham
*Assistant Examiner* — Shick Hom
(74) *Attorney, Agent, or Firm* — Knobbe Martens Olson & Bear LLP

(57) ABSTRACT

One embodiment disclosed herein relates to a routing method performed by a unit forming a node in a network made up of a plurality of nodes, the method comprising receiving or generating a message including destination geographical position data representing the geographical position of a destination node of the message and transmitting the message to a neighboring node selected from a plurality of neighboring nodes as a function of the destination geographical position and as a function of a location table, the location table including the geographical position of at least one neighboring node. In some embodiments, the method comprises receiving path data from a neighboring node on board a first vehicle, the path data representing a planned path for the first vehicle and updating the location table as a function of the path data.

11 Claims, 3 Drawing Sheets

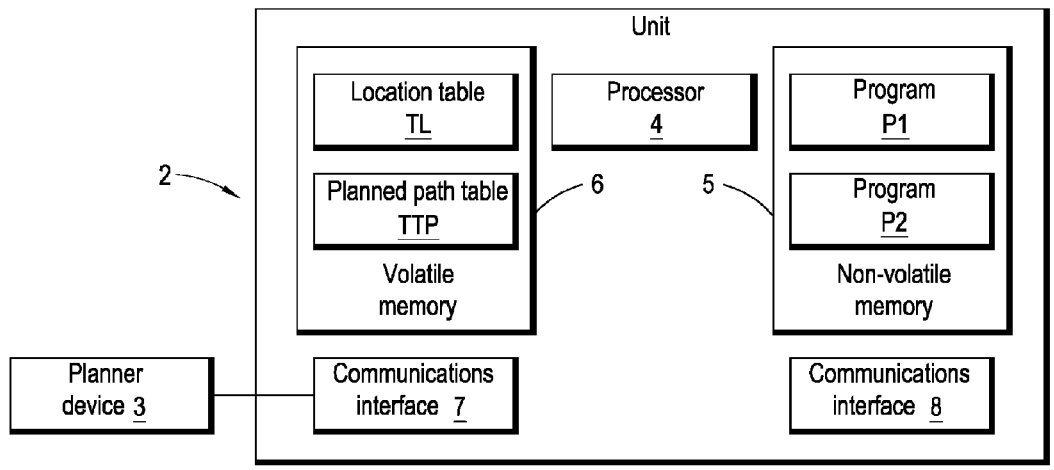
FIG. 2
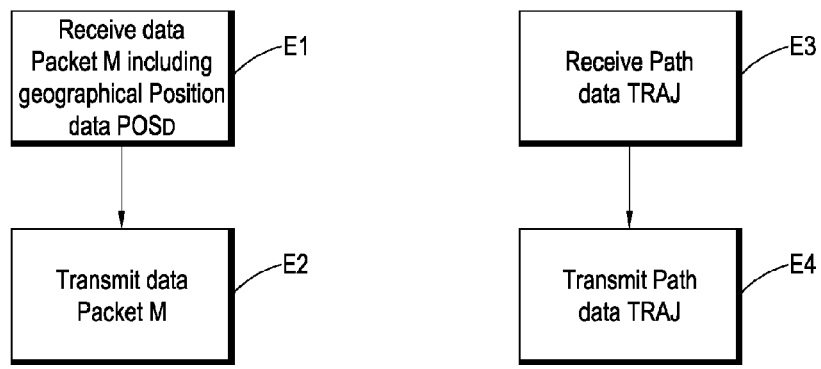
FIG. 3
FIG. 4

ROUTING METHOD AND A UNIT FOR COMMUNICATION BETWEEN VEHICLES

RELATED APPLICATIONS

This application is the U.S. National Phase of Application No. PCT/FR2013/050686 entitled "ROUTING METHOD AND EQUIPMENT FOR COMMUNICATION BETWEEN VEHICLES" filed Mar. 28, 2013, which designated the United States, and which claims the benefit of French Application No. 1252840 filed Mar. 29, 2012.

BACKGROUND OF THE INVENTION

The invention relates to the general field of telecommunications. The invention relates in particular to a routing protocol for an ad hoc network enabling communication to take place between vehicles.

For several years, a large amount of work has been done concerning intelligent transport systems (ITS). In particular, proposals have been made to provide an ad hoc network enabling communication to be provided between vehicles by means of on-board ITS stations. Applications for communication between vehicles include in particular exchanging information about road safety, returning vehicle data for preventative maintenance, returning vehicle utilization information for the purpose of billing insurance based on use, returning vehicle path data for paying an ecotax or city toll charges, etc.

Given the specific features of such applications, proposals have been made to base the operation of such a network on technology known as geonetworking, in which addressing and routing are based on the geographical position(s) of the destination(s), in contrast to a conventional network which makes use of network addresses, e.g. Internet protocol (IP) addresses. The European Telecommunications Standard Institute (ETSI) gives the following definition of geonetworking: "A network service that uses geographical positions and provides ad hoc communication without the need for a communications coordinating infrastructure".

ETSI's technical specifications document TS 102 636-4-1 describes a stack of protocols known as GeoNetworking. One of the data structures used in those protocols is referred to as the location table.

Each entry in the location table corresponds to an ITS station, either for which there is an ongoing location request, or else for which the location is known. Each entry has a lifetime, which is set at 20 seconds by default. When this lifetime is reached, the entry is deleted from the table.

An entry contains the following information: the address (in the GeoNetworking network sense) of the ITS station in question; the address of the station at data link level; the type of the station (vehicle or roadside), the station's position vector (position, speed, heading, position time stamp, position accuracy, speed accuracy, heading accuracy), a Boolean flag indicating whether a location request is or is not in progress, a Boolean flag indicating whether the ITS station is in the direct vicinity, and the sequence number of the packet most recently received from the station.

When a source ITS station needs to send a message to a destination ITS station, it needs to know the geographical location of the destination station. If this information is not available in the location table, the source station launches a location request. This propagates in compliance with the protocol in use until it reaches the destination station. That station then responds to the source station by supplying it with its own location.

Furthermore, each ITS station broadcasts its position on a regular basis to its neighbors. By default, the period for this broadcasting is set at 3 seconds.

Each entry in the location table is created and/or updated as a function of service requests from higher layers, and as a function of communications with the other ITS stations. Thus, by way of example, a request to send a data message to an ITS station that does not yet have a corresponding entry in the location table will cause a location request to be started (which will take place using the above-described mechanism), and will cause an entry to be created in the location table for the station in question, the corresponding Boolean flag specifying that a location request is in progress. When the response to the location request is received, the flag is set to indicate that the location has been received, and the position vector of the station is updated.

Likewise, when a packet is received from a neighboring ITS station, or when a packet transmitted by a neighboring ITS station is received for transferring to another ITS station, the entry in the location table corresponding to the ITS station that transmitted the packet is updated, with the previously existing position vector being replaced by the position vector contained in the packet, if that vector is more recent.

Updating an entry in the location table resets the associated lifetime to zero.

The GeoNetworking routing algorithms rely on the content of the location table in order to route the packets from ITS station to ITS station.

The content of the location table is relatively local to the ITS station in question, since it is derived mainly from exchanges with neighboring ITS stations. Furthermore, in situations in which the vehicles carrying the ITS stations have paths that have little correlation (typically away from motorways and main roads), the entries describing neighboring ITS stations disappear quickly from the location table, since the vehicles in question move apart from one another.

The quantity and the pertinence of the information contained in the location table are thus limited. There is therefore a need to improve the routing of a data packet in a network based on geonetworking.

OBJECT AND SUMMARY OF THE INVENTION

The invention proposes a routing method performed by a unit forming a node in a network made up of a plurality of nodes, the method comprising:
  a step of receiving or generating a message including destination geographical position data representing the geographical position of a destination node of the message; and
  a step of transmitting the message to a neighboring node selected from a plurality of neighboring nodes as a function of the destination geographical position and as a function of a location table, the location table including the geographical position of at least one neighboring node.

The routing method is remarkable in that it comprises:
  a step of receiving path data from a neighboring node on board a first vehicle, the path data representing a planned path for said first vehicle; and
  a step of updating said location table as a function of said path data.

Correspondingly, the invention provides a unit suitable for forming a node in a network made up of a plurality of nodes, the unit comprising:

means for receiving or generating a message including destination geographical position data representing the geographical position of a destination node of the message; and means for transmitting the message to a neighboring node selected from a plurality of neighboring nodes as a function of the destination geographical position and as a function of a location table, the location table including the geographical position of at least one neighboring node.

This unit is remarkable in that it comprises:

means for receiving path data from a neighboring node on board a first vehicle, the path data representing a planned path for the first vehicle; and means for updating the location table as a function of the path data.

In corresponding manner, the invention provides a routing method performed by a unit forming a node in a network made up of a plurality of nodes, the unit being on board a vehicle, the routing method comprising:

a step of receiving or generating a message including destination geographical position data representing the geographical position of a destination node of the message; and a step of transmitting the message to a neighboring node selected from a plurality of neighboring nodes as a function of said destination geographical position and as a function of a location table, the location table including the geographical position of at least one neighboring node.

This routing method is remarkable in that it comprises:

a step of receiving path data representing a planned path for the vehicle; and a step of transmitting said path data to a neighboring node.

Correspondingly, the invention provides a unit suitable for forming a node of a network made up of a plurality of nodes, the unit being for use on board a vehicle and comprising:

means for receiving or generating a message including destination geographical position data representing the geographical position of a destination node of the message; and means for transmitting said message to a neighboring node selected from a plurality of neighboring nodes as a function of said destination geographical position and as a function of a location table, said location table including the geographical position of at least one neighboring node.

This unit is remarkable in that it comprises:

means for receiving path data representing a planned path for the vehicle; and means for transmitting said path data to a neighboring node.

The invention thus relates to a plurality of interrelated items, namely a unit that transmits path data, and a unit that receives and uses the transmitted path data. Naturally, a single unit may perform both functions.

By transmitting path data between units and by updating the location table as a function of planned paths, a unit may have a location table containing a much greater number of locations of other units, and it may have these locations for a duration that is much longer (which duration may be the remaining duration for each path). Thus, when the location table is used to route the received message, routing can be more pertinent. Furthermore, having a larger number of locations in the location table makes it possible to reduce the number of location requests that are needed.

In an implementation, the step of updating said location table comprises:

a step of storing received path data in a planned path table, the planned path table including path data for at least one neighboring node; and a step of updating the location table as a function of at least one position that is determined as a function of the planned path table.

The planned path table makes it possible to store path data in a manner that is independent of the location table, which table may thus comply with the GeoNetworking protocol, for example.

In an implementation, the routing method comprises:

a step of receiving a second message including source geographical data representing the geographical position of a source node of the second message;

a step of comparing the source geographical position data with a position of said source node as determined as a function of the planned path table; and if the comparison step indicates a difference, a step of deleting the path data corresponding to said source node from the planned path table.

This enables the received position to be given priority over positions that are determined from the planned path table, and in particular this makes it possible to take account of a change of path.

The unit may be on board a second vehicle and connected to a planner (planning) device suitable for transmitting second path data representing a planned path for said second vehicle, the method comprising:

a step of receiving said second path data from said planner device; and a step of transmitting said second path data to a neighboring node.

Under such circumstances, the unit thus handles both path data received from other units and also its own path data, which it sends to the other units.

The path data may comprise data describing successive positions, each position being associated with a time of passage relative to a departure time, and data describing a plurality of departure times.

This makes it possible to reduce the amount of path data that needs to be transmitted and stored.

The step of receiving path data may comprise receiving data concerning a plurality of paths representing a plurality of paths planned for the vehicle, and the step of transmitting path data may comprise transmitting a subset of said path data to a neighboring node.

This also makes it possible to reduce the amount of data that needs to be transmitted and stored.

The invention also provides a computer program including instructions for executing steps of a routing method in accordance with the invention when said program is executed by a computer.

The program may make use of any programming language, and it may be in the form of source code, object code, or of code intermediate between source code and object code, such as in a partially compiled form, or in any other desirable form.

The invention also provides a computer readable data medium or a storage medium that includes instructions of a computer program as mentioned above.

The above-mentioned storage media may be any entity or device capable of storing the program. For example, the medium may comprise storage means such as a read only memory (ROM), e.g. a compact disk (CD) ROM, or a microelectronic circuit ROM, or indeed magnetic recording means such as a floppy disk or a hard disk.

Furthermore, the data medium may correspond to a transmissible medium such as an electrical or optical signal, suitable for being conveyed via an electrical or optical cable, by radio, or by other means. The program of the invention may in particular be downloaded from an Internet type network.

Alternatively, the storage media may correspond to an integrated circuit in which the program is incorporated, the circuit being adapted to be executed or to be used in the execution of the method in question.

BRIEF DESCRIPTION OF THE DRAWINGS

Other characteristics and advantages of the present invention appear from the following description made with reference to the accompanying drawings, which show an implementation having no limiting character. In the figures:

FIG. 2 shows the hardware architecture of a FIG. 1 unit; and

FIGS. 3 to 6 show the main steps of a routing method performed by a FIG. 1 unit.

DETAILED DESCRIPTION OF AN IMPLEMENTATION

Figure 1:
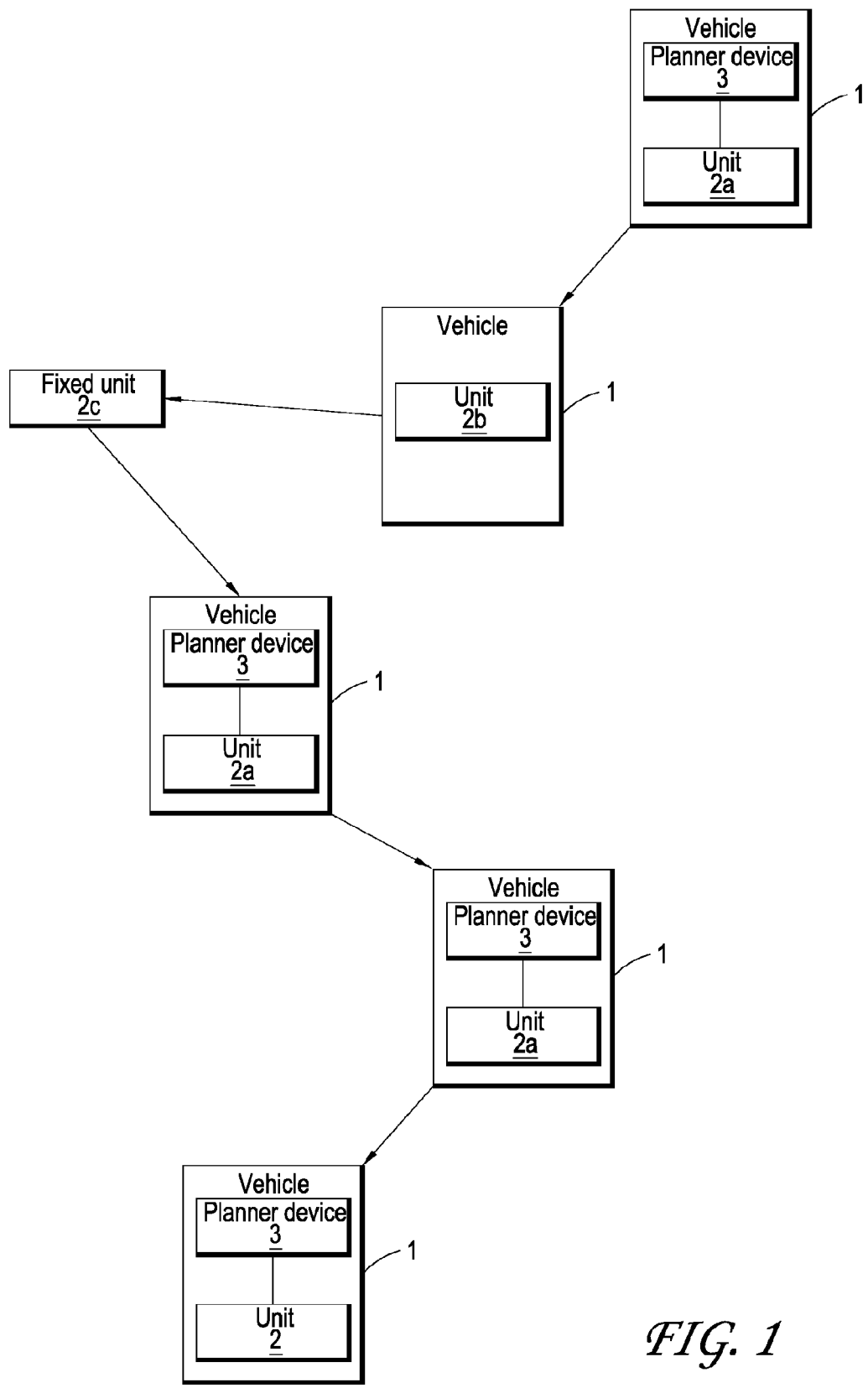
FIG. 1 shows a network comprising units in accordance with the invention.

FIG. 1 shows a set of units 2 forming nodes of a wireless network. A unit referenced 2a is a unit on board a vehicle 1 having a planner device 3, a unit referenced 2b is a unit on board a vehicle 1 that does not have planner device 3, and a unit referenced 2c is a fixed unit, i.e. that is not on board a vehicle 1. Below, the reference 2 is used to designate any of the units 2a, 2b, or 2c when there is no need to distinguish between them.

The units 2 perform two functions. Firstly, each unit 2 comprises an ITS station that generates and/or collects data relating to the vehicle 1 and/or to its environment, and that can decide to send some of this data to a destination, e.g. to one or more other vehicles 1. Secondly, each unit 2 comprises a router that forms a node of an ad hoc network based on geonetworking. The router is incorporated in the ITS station or it communicates with that station.

Thus, a source vehicle 1 can transmit a data packet to a destination vehicle 1 via transit vehicles 1, and possibly also via fixed units 2c, as represented by arrows in FIG. 1. For this purpose, the unit 2 of the source vehicle 1 transmits a data packet that has a destination field containing the geographical position of the destination vehicle 1. By way of example, this geographical position may be specified in compliance with the GeoNetworking protocol mentioned in the introduction. When a unit 2 receives such a data packet, it forwards it to a neighboring node in compliance with a routing method that is described below, until the packet reaches the destination node.

Furthermore, certain vehicles 1 also include respective planner devices 3. A planner device 3 is capable of providing path data representing at least one planned path for the vehicle 1 in which the device is mounted. By way of example, in a particular vehicle 1, the planner device 3 may be a navigation assistance device. In a public transport vehicle 1, it may be an operations assistance and passenger information system (OAS/PIS). In a taxi, it may be a system for allocating and tracking customer trips.

FIG. 2 shows the hardware architecture of a unit 2 in an embodiment. The unit 2 has the hardware architecture of a computer and comprises in particular a processor 4, a non-volatile memory 5, a volatile memory 6, and a communications interface 8. At least for a unit 2a on board a vehicle 1 that includes a planner device 3, the unit 2 also includes a communications interface 7.

The processor 4 serves to execute computer programs stored in the non-volatile memory 5 while making use of the volatile memory 6 as working memory. In the embodiment shown, the non-volatile memory 5 stores a program P1 and a program P2. The operation of the unit 2 as an ITS station results from executing the program P1, and the operation of the unit 2 as a router results from executing the program P2. The programs P1 and P2 may be executed in parallel. When the router is incorporated in the ITS station, the programs P1 and P2 may form portions of a single piece of software.

In another embodiment, the unit 2 comprises two distinct devices, each having the hardware architecture of a computer, one of them performing the ITS station function and the other the router function.

A unit 2a is connected via its communications interface 7 to the planner device 3. The unit 2a may thus receive data coming from the planner device 3, e.g. via a serial link, a Bluetooth link, etc. The planner device 3 is capable in particular of supplying the unit 2 with path data representing a planned path for the vehicle 1. By way of example, the path data may comprise a sequence of geo-referenced and time-stamped straight-line segments.

A unit 2a or 2b may also obtain the current position of the vehicle 1 in which it is mounted, e.g. from the planner device 3 or from some other positioning device may be external or internal.

Finally, the communications interface 8 serves to transmit data packets over a wireless link to another unit 2 nearby.

Each unit 2 stores a location table TL and a planned path table TTP, e.g. in its volatile memory 6.

In operation, the location table TL includes the geographical position of at least one neighboring unit 2, unless the vehicle in question has not yet encountered any other vehicle and has not needed to communicate. For example, the location table TL is in compliance with the GeoNetworking protocols. Under such circumstances, each entry in the location table TL corresponds to a unit 2, which may be a unit for which there is an ongoing location request, or else a unit of location that is known. Each entry has a lifetime that is set at 20 seconds by default. When this lifetime is reached, the entry is deleted from the table. An entry contains the following information: the address (in the GeoNetworking network sense) of the unit 2 in question, the address of the unit 2 at data link level, the type of the unit (unit 2a or 2b on board a vehicle 1, or a roadside unit 2c that is fixed), the unit's position vector (position, speed, heading, position time stamp, position accuracy, speed accuracy, heading accuracy), a Boolean flag indicating whether a location request is or is not ongoing, a Boolean flag indicating whether the unit 2 is in the direct vicinity, and the sequence number of the packet most recently received from the unit 2.

The planned path table TTP includes path data TRAJ coming from other units 2. Each entry in the planned path table TTP corresponds to one unit 2 and, by way of example, contains the following information: the address (in the GeoNetworking network sense) of the unit 2 that is concerned by the path, the address of the unit 2 at data link level, the type of the unit (unit 2a or 2b on board a vehicle 1, or roadside unit 2c that is fixed), a path identification number, a path description, and the date and time at which the path was created. The description of the path may be provided using the various variants described below.

FIG. 3 shows steps of a routing method performed by a unit 2.

In a step E1, the unit 2 receives a data packet M including geographical position data $POS_D$ of a destination, which data is contained in a destination field. By way of example, the destination is the unit 2a or 2b of some other vehicle 1, a set of units 2 located within a determined geographical area, a fixed unit 2c, etc. For a unit 2 that is acting as an intermediate node, the data packet M is received via the communications interface 8 coming from another node of the network. For the unit 2 of the source vehicle 1, the data packet M is a message internal to the unit 2 as generated by its ITS station portion and delivered by the ITS station portion to the router portion of the unit 2.

Thereafter, in a step E2, the unit 2 transmits the data packet M via the communications interface 8 to a neighboring node selected from among a plurality of neighboring nodes as a function of the geographical position $POS_D$ of the destination and as a function of the location table TL, in application of a predetermined routing method. The routing method of step E2 may for example be one of the methods of the GeoNetworking protocol mentioned in the introduction. The neighboring node may be the destination if it is within range, or it may be a transit node.

FIG. 4 shows the steps of a routing method performed by a unit 2a, i.e. a unit on board a vehicle 1 having a planner device 3.

In a step E3, the unit 2a receives path data TRAJ representing a planned path for the vehicle 1 in which the unit is mounted. As explained above, the path data TRAJ is supplied by the planner device 3. It may relate to an ongoing path or to a future path.

The path data TRAJ also includes a path identification number that is created by the unit 2a in order to identify in a unique manner each new path supplied by the planner device 3. An order relationship is defined in the sequence of identification numbers for a given unit 2a. By way of example, it is possible merely to select an integer that is incremented for each new path (naturally returning to 0 once the maximum value has been reached). In a variant, it is possible to use a duration that has elapsed between a reference time and the instant at which the identification number is created.

Thereafter, in a step E4, the unit 2a transmits the path data TRAJ to at least one neighboring node, which may be a unit 2a, 2b, or 2c.

Figure 5:
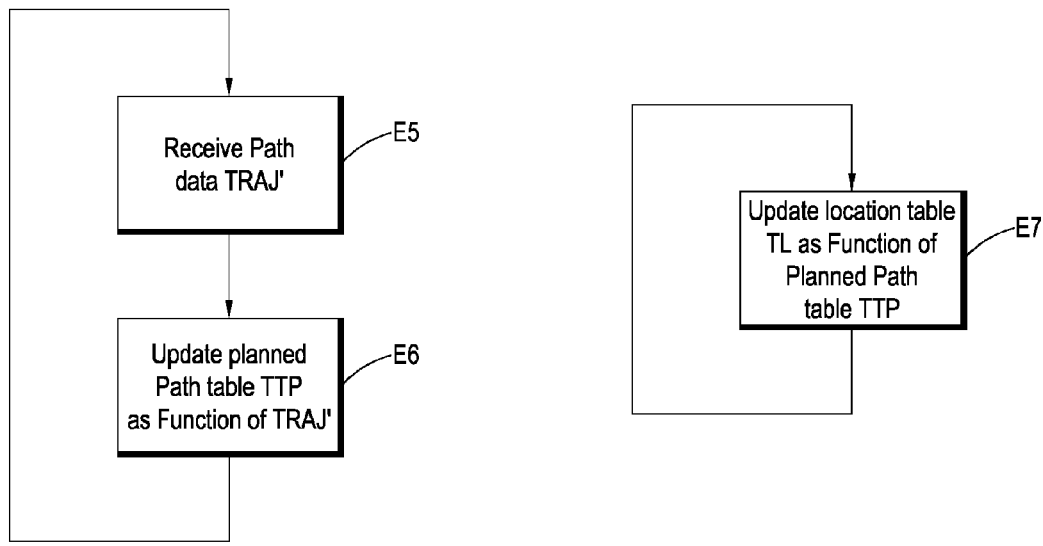

FIG. 5 shows the steps of a routing method performed by a unit 2.

In a step E5, the unit 2 receives path data TRAJ' from a neighboring unit 2a. Unlike the step E3 of FIG. 4, the path data TRAJ' does not represent a planned path for the vehicle 1 carrying the unit 2 that is performing the steps of FIG. 5. On the contrary, the path data TRAJ' represents a planned path for another vehicle 1, namely the vehicle 1 carrying the neighboring unit 2a that sent the received path data TRAJ'.

Thereafter, in a step E6, the planned path table TTP is updated as a function of the received path data TRAJ'. Specifically, the unit 2 creates or updates the entry in its planed path table TTP that corresponds to the unit 2a that has sent the path data TRAJ'.

In parallel, in a step E7, the unit 2 updates the location table TL as a function of the planned paths table TTP. The step E7 may be performed for example in periodic manner and/or in response to updating the planned path table TTP. For example, the step E7 may be repeated at a period corresponding to the predefined lifetime of entries in the location table TL.

Specifically, for each path TRAJ' in the planned path table TTP corresponding to a unit 2a that is not to be found in the location table TL, the unit 2 determines the location along the corresponding path at the present time on the basis of the path description information. If this position exists, it is added to the location table TL.

In order to determine the location along a path corresponding to the present time, it suffices to scan through the sequence of positions describing the path so as to reach a position for a time that is immediately after the present time. This position (or the preceding position) may be used for updating the location table TL. In a variant, if the description of the path is made in the form of a sequence of segments (with a time of passage for each end thus being known), it is possible to apply a simple proportionality rule in order to determine a location along the segment in question, corresponding specifically to the given time. In another variant, if a map database is available, it is possible to be even more accurate, by taking account of segments of the roadway.

Because path data TRAJ is transmitted between units 2, because a planned path table TTP is stored, and because the location table TL is updated as a function of the planned path table TTP, a unit 2 may have a much larger number of locations of other units 2 available in its location table TL and this information may be available over a duration that is much longer (i.e. the duration that is still to run for each path). Thus, when the location table TL is used in step E2 for routing a message M, the routing may be more pertinent.

Furthermore, by having a larger number of locations in the location table TL, it is possible to reduce the number of location requests. The extent of this reduction depends largely on the types of service that need to communicate. For example, two vehicles 1 starting from the same point and going in different directions, and having drivers who know each other and who wish to remain in contact via a chat application, will take better advantage of such optimization.

Naturally, the location table TL is also updated as a function of messages including the position of a unit 2. The information in position messages that are broadcast by the units 2 has priority over the information that comes from the planned path table TTP.

Figure 6:
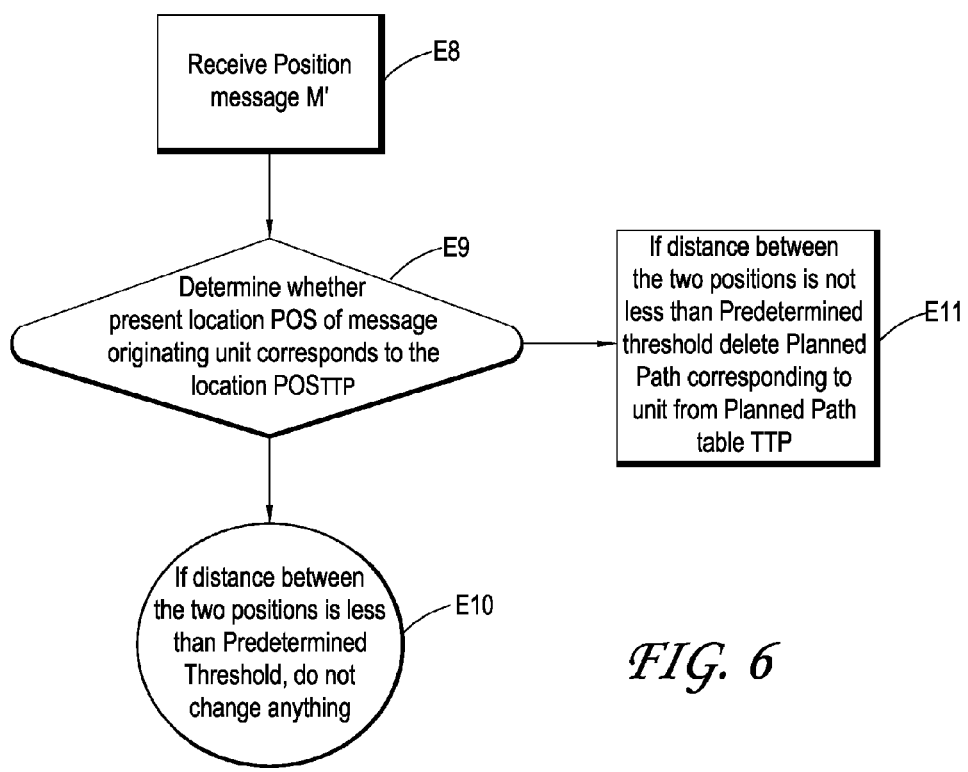

By way of example, this is performed in application of steps shown in FIG. 6, which are performed by a unit 2 receiving a position message M' from another unit 2. When a position message M' of a unit 2 is received (step E8), and when the unit 2 that originated the received message is already mentioned in the location table TL of the receiving unit 2, the receiving unit verifies whether there is a planned path in its planned path table TTP for the message-originating unit 2 and for the present time. If so, the receiving unit 2 determines whether the present location POS of the message-originating unit 2 corresponds to the location $POS_{TTP}$ as deduced from the planned path table TTP (step E9). For example, it is verified whether the distance between the two positions is less than a predetermined threshold. If so, the receiving unit 2 does not change anything (step E10). Otherwise, the receiving unit 2 deletes the planned path corresponding to the unit 2 that originated the message M' from its planned path table TTP (step E11).

By way of example, the steps E1 to E11 of FIGS. 3 to 6 correspond to a unit 2 executing in parallel a plurality of software modules of the above-mentioned program P2. The steps E3 and E4 of FIG. 4 relate solely to a unit 2a that is connected to a planner device 3. A unit 2a thus handles both path data coming from other units and its own path data, which it sends to the other units.

As explained above, a path may be described in several ways: a sequence of positions that are regularly spaced apart in time, that are regularly spaced apart in space, a combination of the two (in order to provide better tracking of roadway segments when a vehicle slows down, for example), the real segments of roadway (typically when a digital map is available on board), etc. It is also possible to reduce the quantity of data concerning each intermediate position, e.g. by making use only of the difference in position relative to the preceding position and the difference in time relative to the time of the preceding position, instead of making use of an absolute position and an absolute time.

The path data represents successive positions that are not all in alignment along the same direction. In other words, a simple instantaneous speed vector does not constitute a description of a planned path.

For a unit 2a installed in a vehicle 1 that runs repeatedly over the same paths over a long period of time (typically a public transport bus), the path data TRAJ broadcast to the other units 2 in the neighborhood may contain the description of the path in question, together with a time stamp, e.g. expressed relative to the departure time for the first trip of the day, together with the list of subsequent departure times over the day. Such optimization serves to decrease both the volume of the broadcasts performed by each unit 2a to its neighbors, and the volume of the planned path table TTP that needs to be stored, by modifying its format so as to accommodate this optimization.

When a vehicle 1 possesses a large number of paths that are planned in advance, the unit 2a may make a selection and broadcast only the path(s) relating to a limited forthcoming period (e.g. one hour). The unit 2a may also decide to accept from the planner device 3 only the path(s) relating to a limited future period (e.g. one hour). Under such circumstances, the unit 2a makes a new request to the planner device 3 for the following paths, once the time has come.

A vehicle 1 need not necessarily follow a path as planned, e.g. on the initiative of the driver or as a result of detecting that the vehicle is late or early, or as a result of some other service proposing a change of path, with this being accepted by the driver. This can be taken into account in various ways, possibly in association:

The lifetime of an entry in the planned path table TTP may be set to a duration that is shorter than the duration of the path (e.g. 20 minutes). The probability of the vehicle changing path over such a duration is smaller.

Each entry in the planned path table TTP is associated with a credibility coefficient as a function of the type of vehicle 1 following that path. For example, the coefficient may have a very high value for public transport buses. It may also have a very high value for a vehicle running paths that are modified rarely, which may be detected by automatic learning performed by the unit 2. The lifetime of an entry in the planned path table TTP depends on this credibility coefficient.

When a path is modified, the unit 2a in the vehicle 1 in question becomes aware of this, e.g. because the planner device 3 tells it explicitly (using the application protocol between the planner device 3 and the unit 2a), or because the unit 2a detects that the new path it is receiving is defined for a time period for which it has already has a planned path. The unit 2a gives a new identification number to this modified path. When the unit 2 receives planned path information from a unit for which it already has a planned path covering all or part of the time period in question, it compares the two identification numbers and retains only the path having the higher identification number. If the received path relates to a period that is covered in part or in full by a plurality of paths in the planned path table, then all of the paths having an identification number lower than the number of the received path are deleted from the planned path table.

The invention claimed is:

1. A routing method performed by a unit forming a node in a network made up of a plurality of nodes, the method comprising:
   receiving or generating a message including destination geographical position data representing the geographical position of a destination node of the message; and
   transmitting said message to a neighboring node selected from a plurality of neighboring nodes as a function of said geographical position of the destination node and as a function of a location table, said location table including the geographical position of at least one neighboring node;
   wherein the method further comprises:
   receiving path data from a neighboring node which is on board a first vehicle and which is one of the plurality of neighboring nodes, the path data representing a planned path for said first vehicle; and
   updating said location table as a function of said path data.

2. The routing method according to claim 1, wherein said updating said location table comprises:
   storing received path data in a planned path table, said planned path table including path data for at least one neighboring node; and
   updating the location table as a function of at least one position that is determined as a function of the planned path table.

3. The routing method according to claim 2, comprising:
   receiving a second message including source geographical position data representing the geographical position of a source node of the second message;
   comparing the source geographical position data with a position of said source node as determined as a function of the planned path table; and
   if the comparison indicates a difference, deleting the path data corresponding to said source node from the planned path table.

4. The routing method according to claim 1, wherein said unit is on board a second vehicle and is connected to a planner device suitable for transmitting second path data representing a planned path for said second vehicle, the method comprising:
   receiving said second path data from said planner device; and
   transmitting said second path data to the neighboring node.

5. A non-transitory computer readable data medium having stored thereon a program including instructions for executing a routing method performed by a unit forming a node in a network made up of a plurality of nodes when said program is executed by a computer, wherein said method comprises:
   receiving or generating a message including destination geographical position data representing the geographical position of a destination node of the message; and
   transmitting said message to a neighboring node selected from a plurality of neighboring nodes as a function of said geographical position of the destination node and as a function of a location table, said location table including the geographical position of at least one neighboring node;

wherein the method further comprises:
receiving path data from a neighboring node which is on board a first vehicle and which is one of the plurality of neighboring nodes, the path data representing a planned path for said first vehicle; and
updating said location table as a function of said path data.

6. A unit suitable for forming a node in a network made up of a plurality of nodes wherein the unit comprises:
a hardware processor which is configured to:
receive or generate a message including destination geographical position data representing the geographical position of a destination node of the message; and
transmit said message to a neighboring node selected from a plurality of neighboring nodes as a function of said geographical position of the destination node and as a function of a location table, said location table including the geographical position of at least one neighboring node;
wherein the unit is further configured to:
receive path data from a neighboring node which is on board a first vehicle and which is one of the plurality of neighboring nodes, the path data representing a planned path for said first vehicle; and
update said location table as a function of said path data.

7. A routing method performed by a unit forming a node in a network made up of a plurality of nodes, said unit being on board a vehicle, the routing method comprising:
receiving or generating a message including destination geographical position data representing the geographical position of a destination node of the message; and
transmitting said message to a neighboring node selected from a plurality of neighboring nodes as a function of said geographical position of the destination node and as a function of a location table, said location table including the geographical position of at least one neighboring node;
wherein the method further comprises:
receiving path data representing a planned path for the vehicle; and
transmitting said path data to a neighboring node.

8. The routing method according to claim 7, wherein said path data comprises data describing successive positions, each position being associated with a time of passage relative to a departure time, and data describing a plurality of departure times.

9. The routing method according to claim 7, wherein the process of receiving path data comprises receiving data concerning a plurality of paths representing a plurality of paths planned for the vehicle, and the process of transmitting path data comprises transmitting a subset of said path data to a neighboring node.

10. A non-transitory computer readable data medium having stored thereon a program including instructions for executing a routing method performed by a unit forming a node in a network made up of a plurality of nodes, said unit being on board a vehicle when said program is executed by a computer wherein said method comprises:
receiving or generating a message including destination geographical position data representing the geographical position of a destination node of the message; and
transmitting said message to a neighboring node selected from a plurality of neighboring nodes as a function of said geographical position of the destination node and as a function of a location table, said location table including the geographical position of at least one neighboring node;
wherein the method further comprises:
receiving path data representing a planned path for the vehicle; and
transmitting said path data to a neighboring node.

11. A unit suitable for forming a node of a network made up of a plurality of nodes, said unit being adapted for use on board a vehicle wherein the unit comprises:
a hardware processor which is configured to:
receive or generate a message including destination geographical position data representing the geographical position of a destination node of the message; and
transmit said message to a neighboring node selected from a plurality of neighboring nodes as a function of said geographical position of the destination node and as a function of a location table, said location table including the geographical position of at least one neighboring node;
wherein the unit is further configured to receive path data representing a planned path for the vehicle, and to transmit said path data to a neighboring node which is one of the plurality of neighboring nodes.

* * * * *